June 22, 1943.   C. G. EKHOLM   2,322,620
CENTERLESS GRINDING MACHINE
Filed Oct. 10, 1940
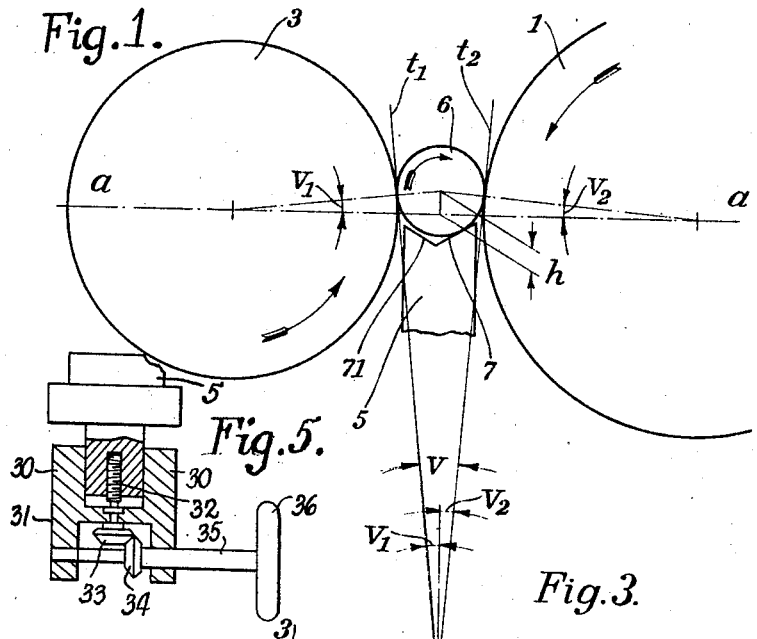
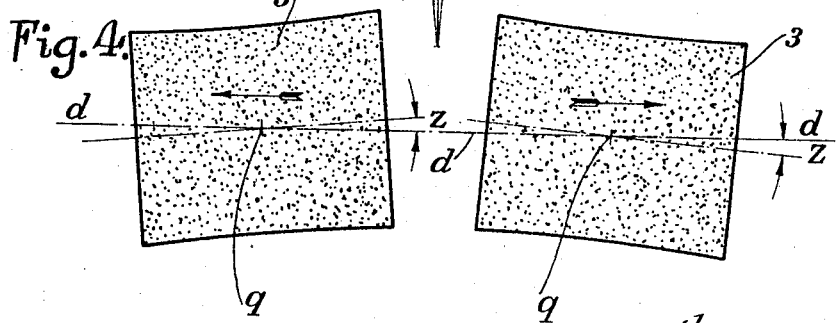
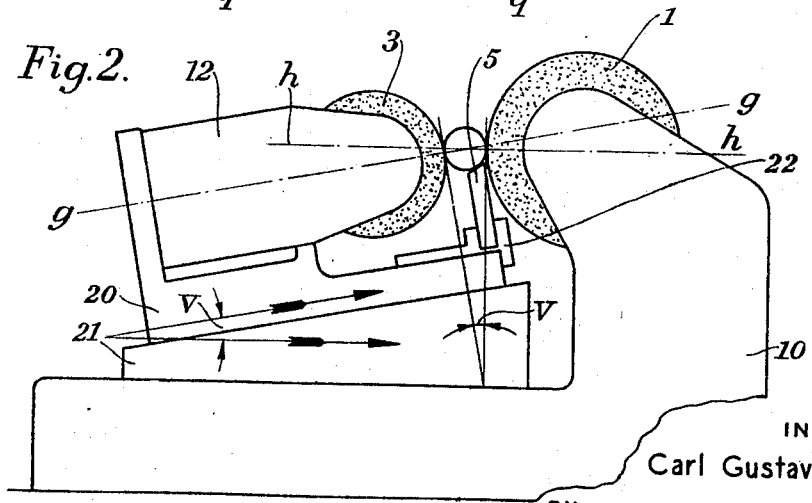
INVENTOR
Carl Gustav Ekholm
BY *Chas. Lyon Russell*
HIS ATTORNEY Patented June 22, 1943

2,322,620

UNITED STATES PATENT OFFICE 2,322,620

CENTERLESS GRINDING MACHINE

Carl Gustav Ekholm, Lidkoping, Sweden

Application October 10, 1940, Serial No. 360,528
In Sweden November 4, 1939

7 Claims. (Cl. 51—103)

The present invention relates to a centerless grinding machine having a grinding wheel and a regulating wheel, one of which is mounted on the fixed machine bed and the other one is mounted on an overslide which in its turn is mounted on an underslide slidable on the machine bed. In centerless grinding machines of this type the two slides in the known constructions have been slidable in the same direction usually in the horizontal direction. During the grinding operation the workpiece is in contact with the regulating wheel and the work support and the grinding wheel, the two wheels forming between themselves a so called grinding throat. If the grinding operation is to lead to a successive decreasing of the out-of-roundness of the workpiece, the work support should be set in such a height that the center of the work piece will be located some distance above or beside the narrowest part of the grinding throat on the side thereof opposite to the work support, so that the workpiece is free to move to a wider part of the grinding throat. The distance of the center of the workpiece from the narrowest part of the grinding throat is of decisive importance for the accurateness as to roundness of the workpiece obtained through the grinding operation. However, the preferred distance is different for different diameters of the workpiece and the grinding and regulating wheels.

A thorough examination has shown that the value decisive for the result of the grinding operation is the angle between the tangents which are passing through the tangent points of the workpiece with the grinding wheel and the regulating wheel respectively. Said angle should have a value between 5 and 20° and preferably should be about 10°. For a certain settled value for this angle, for instance 10°, it is possible for each combination of diameters of the grinding wheel, the workpiece and the regulating wheel to calculate the corresponding distance of the center of the workpiece from the narrowest part of the grinding throat. In this way the correct positioning of the work support can be calculated, but even if curves and tables were made up for all the corresponding values, the adjustment of the work support will be a time-consuming operation which can hardly be performed by unqualified workers.

According to the present invention the desired angle between the tangents is obtained thereby that the guides for the slides form an acute angle with each other. If the work support and the wheel mounted on the overslide are adjusted in a certain manner in relation to each other, as will be described with reference to the drawing, the desired angle between the tangents of the workpiece will be automatically obtained when the two wheels are brought in contact with the workpiece. Fig. 5 is an enlarged vertical projection, partly in section and in greater detail, of the adjustable work support as viewed at right angles to Fig. 2.

In the drawing Figure 1 shows the geometrical correlation between the workpiece and the working parts of a centerless grinding machine. Fig. 2 shows an elevation of a centerless grinding machine according to the invention. Figs. 3 and 4 show the regulating wheel in two different positions.

Fig. 1 shows the geometrical correlation between the grinding wheel 1, the regulating wheel 3 and the workpiece 6, resting on the work support 5. The axes of rotation of the grinding wheel and the regulating wheel are shown parallel with each other and lying in a plane $a$—$a$, which can be horizontal or have a sloping position in relation to the horizontal plane. The work support 5 is located below the plane $a$—$a$ and is provided with two sloping angular supporting surfaces 7, 11. Before the grinding operation the regulating wheel and the work support are to be adjusted in such positions that a workpiece pattern with the dimensions of the workpiece will bear against the supporting surface 7 of the work support and against the regulating wheel as shown in Figure 1. Furthermore the work support should be adjusted at such a height that the center line of the workpiece will be located a certain distance above the narrowest part of the grinding throat, i. e. above the plane $a$—$a$. Thereby the workpiece is free to move to a wider part of the grinding throat, and the grinding operation will lead to a successive reduction of the out-of-roundness of the workpiece. The most suitable height, however, will be different for different diameters of the grinding wheel, the regulating wheel and the workpiece, and the choosing of the correct value of the height has therefore always caused great difficulties in grinding on centerless grinding machines of the constructions hitherto known.

The angle between the plane $a$—$a$ and the line of connection between the centres of the regulating wheel and the workpiece is designated $V_1$, in Fig. 1, and the angle between the plane $a$—$a$ and the connecting line between the centres of the grinding wheel and of the workpiece is designated $V_2$. As the tangents mentioned, which are passing through the points of contact between the workpiece and the regulating wheel respectively the grinding wheel are perpendicular to said two connecting lines, the two tangents will intersect each other at an angle of $V_1+V_2=V$. The value $V=V_1+V_2$ has proved to be of a decisive importance for the result of the grinding operation. The angle V should be between 5 and 20°, and for quite different grinding operations and different values of the diameters of the grinding wheel, the regulating wheel and the workpiece the angle V can be settled to a definite value, suitably 10° as shown in the drawing.

The centerless grinding machine according to the invention is constructed automatically to give the desired angle between the tangents through the points of contact between the workpiece and the grinding wheel respectively the regulating wheel.

Figure 2 shows a centerless grinding machine having a machine bed 10 on which the grinding wheel 1 is directly mounted. The regulating wheel 3 is mounted on a head 12, which is turnably mounted about an axis g—g on an overslide 20. The overslide is carried by guides on an underslide 21 mounted on guides on the machine bed 10. The work support 5 is carried by a separate slide 22 which is slidable on the overslide 20. In the embodiment shown the guides for the overslide 20 form an angle of V (10°) with the horizontal guides for the underslide 21. The overslide 20 is then locked in this position and the grinding operation proper is commenced by sliding the underslide 21 in the direction shown by an arrow against the grinding wheel. When the workpiece comes into contact with the grinding wheel the tangents of the workpiece common with the grinding wheel and the regulating wheel will form the desired angle V (=10°) with each other, so that the grinding operation takes place under advantageous conditions.

When a workpiece is to be ground the work support 5 is first adjusted in relation to the regulating wheel 3 in such position that a workpiece resting against the work support and the regulating wheel will have its center located right in front of the center of the regulating wheel as taken in the direction of movement of the overslide 20. If the axis of the regulating wheel is set parallel with the axis of the grinding wheel, as usual in grinding according to the in-feed-method, the axis of the regulating wheel and the workpiece will thus lie in the same plane g—g extending in the direction of movement of the overslide 20, and being parallel with the axis of rotation of the grinding wheel. If on the other hand the axis of the regulating wheel is skewed a certain angle in relation to the axis of the grinding wheel as is usual in grinding according to the through-feed-method, only the point of intersection between the axis of rotation of the regulating wheel and its skewing axis will lie in said plane. When the adjustment of the work support in relation to the regulating wheel has been made, the overslide 20 is moved on the underslide 21, so that the center of the workpiece will come in the same plane h—h extending in the direction of movement of the underslide 21 as the axis of rotation of the grinding wheel.

It will thus be clear that the adjustment of the work support is always to be performed in such a manner that the centerline of the workpiece will come in a definite height in relation to the overslide 20, and this adjustment can be easily performed by means of a gauging finger or the like. The time necessary for adjustment of the work support is thus reduced and the desired angle between the tangents of the workpiece will be automatically obtained, whereby the grinding operation takes place under advantageous conditions. Furthermore the grinding machine according to the invention has considerable advantages in connection with grinding according to the through-feed-method, as will be clear from Figures 3 and 4.

Fig. 3 shows the regulating wheel 3 skewed in an angle Z in relation to the longitudinal direction of the work support so as to feed the workpieces moving through the grinding throat in the direction shown by an arrow. In order that line contact will occur between the regulating wheel and the workpiece, the regulating wheel is formed by a diamond or other truing tool. The truing tool is moved along a straight line, which is parallel with the through-feed-direction and situated diametrically opposite the desired line of contact between the workpiece and the regulating wheel. The skewing axis q (shown as a point in Figs. 3 and 4) intersects the path of the truing tool under right angle.

Fig. 4 shows the regulating wheel skewed the same angle Z as in Fig. 3 but in the opposite direction in relation to the longitudinal direction of the work support for the through-feeding of workpieces in the opposite direction as shown by an arrow. A regulating wheel which has been trued in the position shown in Fig. 3 so as to give line-contact with the workpiece, also in the position shown in Fig. 4 will have line-contact with the workpiece because the skewing axis intersects the path of the truing tool under right angle. It is therefore possible to use the centerless grinding machine according to the invention for through-feed-grinding of workpieces alternately in the two directions. Hereby the through-feed-grinding of long and heavy rods and tubes is facilitated very much, as these workpieces can be fed in alternating directions through the machine until they are ready-ground.

In centerless grinding machines of the earlier known constructions the contact line between the workpiece and the regulating wheel as a rule was not located in the same plane as the skewing axis but on a certain distance from this plane. On account thereof the path of the truing tool must be placed on the same distance from said plane. If the regulating wheel is skewed the same angle in opposite direction, there will no longer be any line-contact between the workpiece and the regulating wheel. In centerless grinding machines of the earlier known constructions, it has therefore not been possible to perform through-feed-grinding in two different directions, but after each through-feeding the workpieces must be carried back to the entrance-side of the machine to be fed through the machine again in the same direction.

A specific means for adjusting the work support is illustrated in Fig. 5. The support 5 in this case is mounted slidably between relatively fixed guides 30, 30 on a suitable base 31. The support 5 is engaged by a feed screw 32 which is rotatably held in the base 31 and which may be actuated through the medium of gears 33, 34, shaft 35 and hand wheel 36 to adjust the support upwardly and downwardly between the said guides.

The invention is not restricted to the embodiment shown in the drawing but also comprises all possible modifications thereof.

Having thus described my invention, I claim and desire to secure by Letters Patent the following:

1. In a centerless grinding machine the combination with a machine bed and two wheels, of an overslide carrying one of the wheels and an underslide carrying the overslide, the directions of movement of the two slides forming an acute angle with each other of 5 to 20 degrees, and a work support between the wheels.

2. Centerless grinding machine according to claim 1, in which the directions of movements of the two slides are forming an angle of 10° with each other.

3. In a centerless grinding machine the combination with a machine bed and a grinding wheel and a regulating wheel, of an overslide carrying the regulating wheel and an underslide carrying the overslide, the directions of movement of the two slides forming an acute angle with each other of 5 to 20 degrees, and a work support between the wheels.

4. Centerless grinding machine according to claim 3, in which the underslide is mounted on horizontal guides on the machine bed and the overslide is mounted on the underslide on guides which slope downwardly from the grinding wheel.

5. In a centerless grinding machine the combination with a machine bed and a grinding wheel and a regulating wheel, of a head carrying the regulating wheel and being turnably mounted on an overslide about an axis which is intersecting the axis of rotation of the regulating wheel under right angle, and an underslide carrying the overslide and being mounted on guides on the machine bed, the directions of movement of the two slides forming an acute angle with each other of 5 to 20 degrees, and a work support slidably mounted on the overslide.

6. Centerless grinding machine according to claim 5, in which the turning axis of the head is parallel with the direction of movement of the overslide.

7. Centerless grinding machine according to claim 5, in which the grinding wheel is mounted directly on the machine bed.

CARL GUSTAV EKHOLM.